US005994858A

United States Patent [19]
Miura

[11] Patent Number: 5,994,858
[45] Date of Patent: Nov. 30, 1999

[54] METHOD AND APPARATUS FOR DETECTING OBSTRUCTION TO POWERED WINDOW MOVEMENT

[75] Inventor: Yukio Miura, Miyagi-ken, Japan

[73] Assignee: Alps Electric Co., Ltd., Japan

[21] Appl. No.: 09/141,945

[22] Filed: Aug. 28, 1998

[30] Foreign Application Priority Data

Sep. 1, 1997 [JP] Japan ..................................... 9-236098
Sep. 1, 1997 [JP] Japan ..................................... 9-236100

[51] Int. Cl.$^6$ ..................................................... G05B 5/00
[52] U.S. Cl. ........................... 318/283; 318/286; 318/476
[58] Field of Search .................................... 318/432, 434,
318/445, 447, 456–458, 461, 465, 466–470,
474–477, 283, 285, 286

[56] References Cited

U.S. PATENT DOCUMENTS

| | | | |
|---|---|---|---|
| 4,736,144 | 4/1988 | Chun-Pu | 318/467 |
| 5,162,711 | 11/1992 | Heckler | 318/264 |
| 5,280,754 | 1/1994 | Flanagan et al. | 318/468 X |
| 5,436,539 | 7/1995 | Wrenbeck et al. | 318/265 |
| 5,497,326 | 3/1996 | Berland et al. | 318/468 X |
| 5,521,474 | 5/1996 | Hahn | 318/285 |
| 5,539,290 | 7/1996 | Lu et al. | 318/565 |

FOREIGN PATENT DOCUMENTS 195 11 581
A1 10/1995 Germany .

Primary Examiner—Brian Sircus
Attorney, Agent, or Firm—Brinks Hofer Gilson & Lione

[57] ABSTRACT

An obstruction detecting method for use with a power window device comprising a motor activated to open and close a window by means of a window drive mechanism, a motor drive unit for driving the motor, a pulse generator for generating pulses corresponding to revolutions of the motor, a micro-control unit for providing overall drive control, and an operation switch operated manually to instruct the opening and closing of the window. The method comprises the steps of causing the micro-control unit to detect parameter values representing loads applied onto the window when the window is opened or closed; to compare the detected parameter values with a predetermined reference median; to detect an obstruction to the window movement when any detected parameter value is judged to have deviated by at least a predetermined amount from the reference median; and to stop or reverse the motor by means of the motor drive unit on detecting the obstruction. An entire movable range of the window is divided into a plurality of moving areas, each divided moving area being set with the reference median established beforehand as a mean value of the parameter values representing the loads applied onto the window during the window movement throughout each divided moving area with no obstruction occurring thereto.

5 Claims, 13 Drawing Sheets

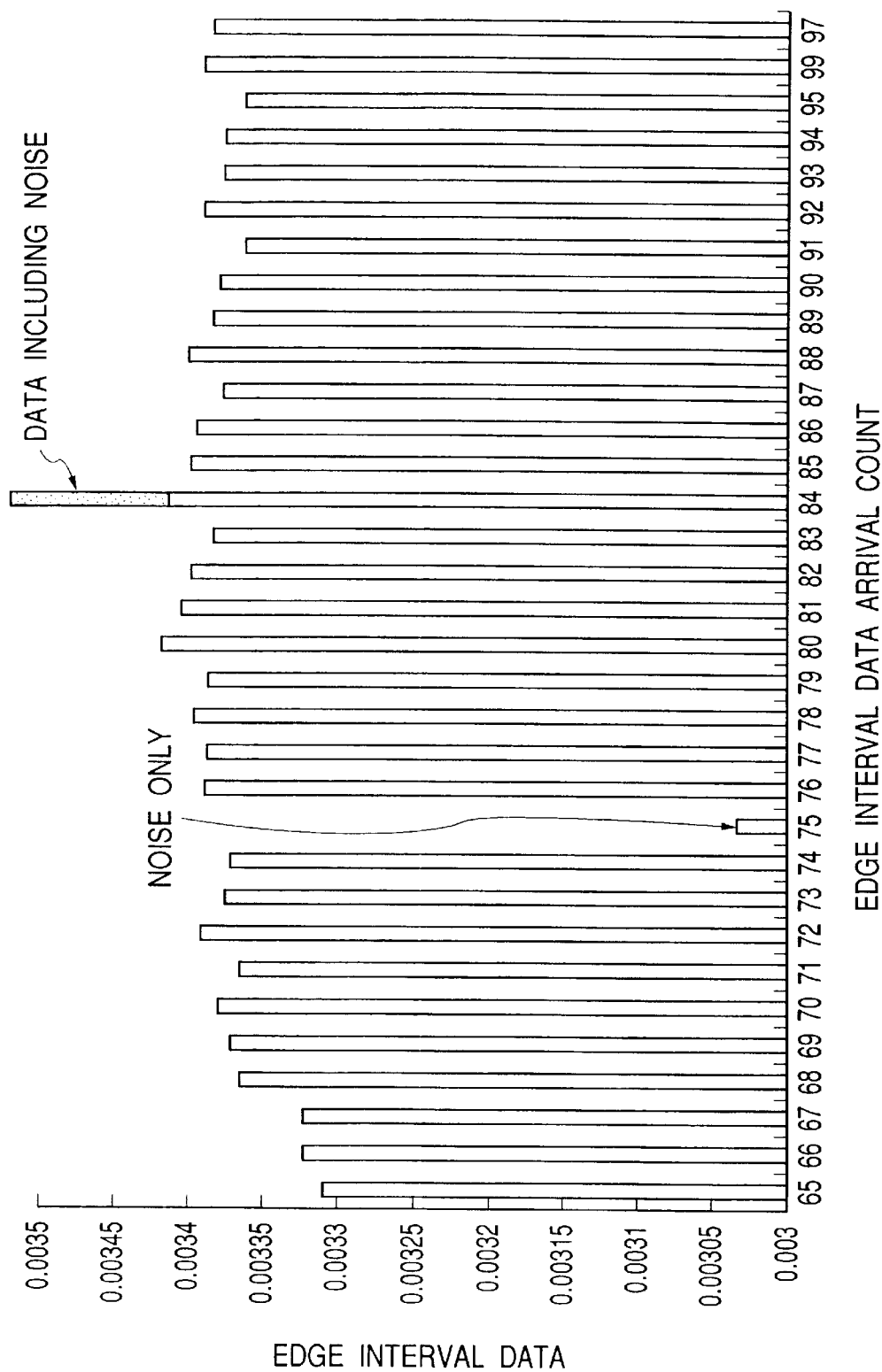

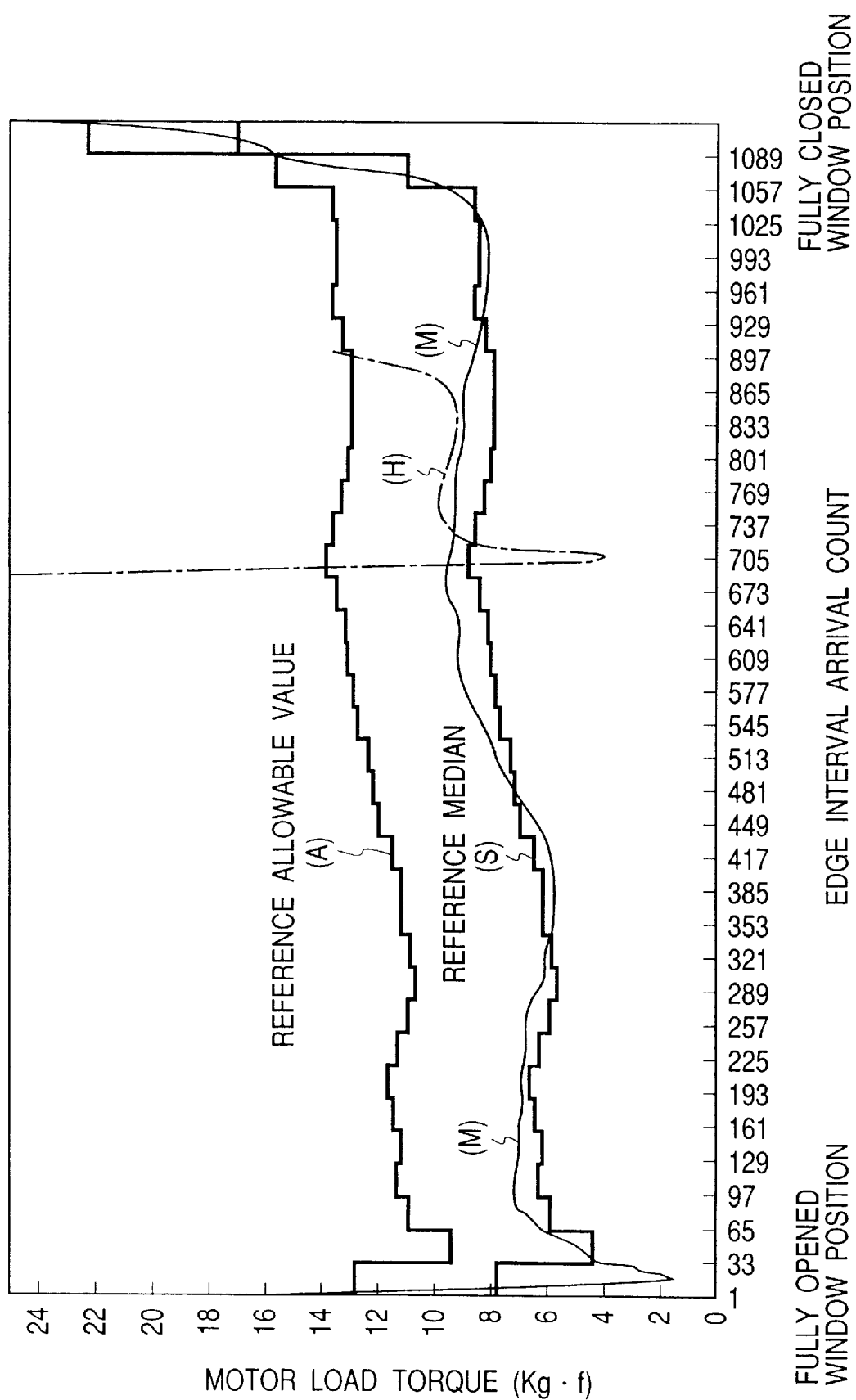

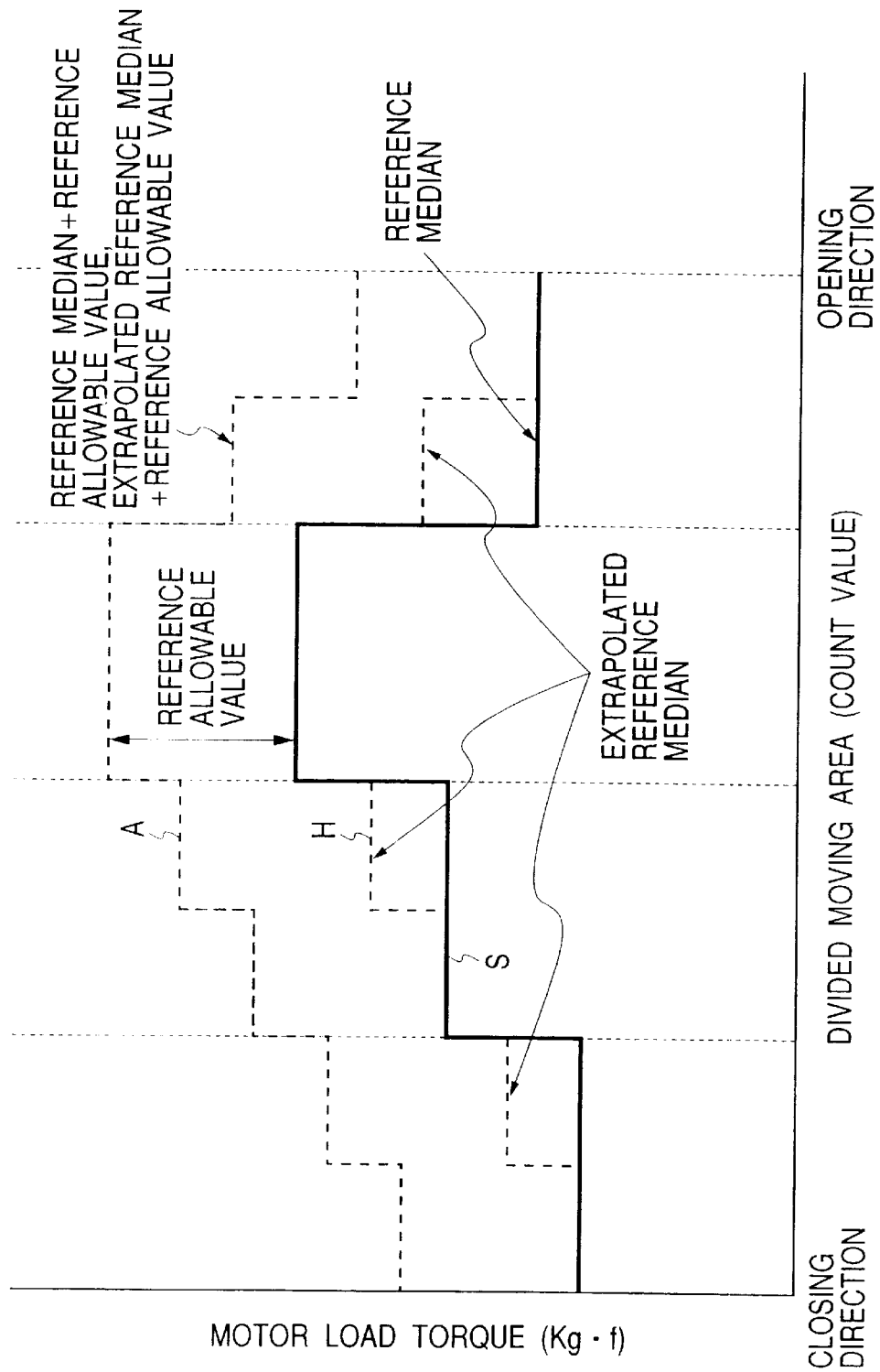

METHOD AND APPARATUS FOR DETECTING OBSTRUCTION TO POWERED WINDOW MOVEMENT

BACKGROUND OF THE INVENTION

1. Field of the Invention

The present invention relates to a method and an apparatus for detecting obstructions to a motor-powered window movement. More particularly, the invention relates to a method and an apparatus for detecting sensitively, accurately and at high speed obstructions that may occur to a power window device during its movement without increasing a memory capacity needed for the function.

2. Description of the Related Art

Various systems have been proposed to detect obstructions that may occur to a power window device during its operation on board the vehicle. One such system is disclosed in conjunction with a power window device in Japanese Published Unexamined Patent Application No. Sho 61-60981.

The disclosed power window device utilizes a motor load current value as the parameter by which to detect obstructions to a motor-powered window movement. The entire movable range of the window is divided into a plurality of portions. Each divided moving area is set beforehand with a reference current value indicating whether or not an obstruction to the window movement has occurred. In operation, a detected motor load current value is compared with the reference current value. If the detected motor load current exceeds the reference current significantly, an obstruction to the powered window movement is judged to have occurred.

In the above power window device, the reference current value for each divided moving area is established on the basis of a peak motor load current in effect when no obstruction takes place during the window movement (opening/closing) throughout the area in question.

Other power window devices are known to adopt a motor torque value as the parameter by which to detect obstructions to the motor-powered window movement.

Unlike the power window device of Japanese Published Unexamined Patent Application No. Sho 61-60981, power window devices utilizing the motor load torque for reference do not divide the entire movable range of the window into multiple portions to establish a reference value for each divided moving area. As such, these power window devices have difficulty in accurately detecting obstructions to the powered window movement.

The power window device disclosed in Japanese Published Unexamined Patent Application No. Sho 61-60981 detects obstructions to the motor-powered window movement using the peak motor load current as the parameter for the detection. What takes place upon detection is as follows: when the motor driving voltage, i.e., the output voltage of the battery on board the vehicle, deviates from a rated output voltage, the motor load current fluctuates in its peak. If noise is overlaid for some reason on the detected motor load current at its peak, the peak motor load current fluctuates likewise.

In such cases, a reference value for each divided moving area of the window is set on the basis of the peak motor load current in effect when no obstruction occurs to the window movement throughout the area in question. It follows that the reference value necessarily contains some error. When the potentially erroneous reference value is used as the basis for detecting obstructions to the powered window movement, faulty judgments tend to occur: an obstruction can be detected where there is none, or a snagged window movement may not be detected where the window is actually jammed.

The cited power window device of Japanese Published Unexamined Patent Application No. Sho 61-60981 apparently meets the demand for enhanced levels of the detection of obstructions to the window movement by dividing the entire movable range of the window into a larger number of portions. However, the increased number of divided moving areas entails a growing number of data items to be addressed and stored: more reference medians to be set for the divided areas, more motor load current values to be detected for each divided area, etc. The data need to be stored by resorting to an increased memory capacity. This translates not only into a power window device of an enlarged scale but also into higher production costs.

SUMMARY OF THE INVENTION

It is therefore an object of the present invention to overcome the above and other deficiencies and disadvantages of the prior art and to provide a method for accurately detecting obstructions that may occur to a power window device during its movement, independently of noise that may be overlaid on the detected output serving to establish reference medians.

It is another object of the present invention to provide a method for more accurately detecting obstructions to a power window device in operation through the use of a parameter closer to the load on the moving window than before.

It is a further object of the invention to provide a method for accurately detecting obstructions to a power window device during its motor-powered window movement even when the motor driving voltage fluctuates.

It is an even further object of the invention to provide an apparatus for accurately and sensitively detecting obstructions to a power window device in operation without increasing the capacity of the memory needed for the function.

In carrying out the invention and according to a first aspect thereof, there is provided an obstruction detecting method for use with a power window device comprising: a motor activated to open and close a window by means of a window drive mechanism; a motor drive unit that drives the motor; a pulse generator that generates pulses corresponding to revolutions of the motor; a micro-control unit (MCU) that provides overall drive control; and an operation switch operated manually to instruct the opening and closing of the window. This obstruction detecting method comprises the steps of causing the micro-control unit to detect parameter values representing loads applied onto the window when the window is either opened or closed; to compare the detected parameter values with a predetermined reference median; to determine the presence of an obstruction to the window movement when any detected parameter value is judged to have deviated by at least a predetermined amount from the reference median; and either to stop or to reverse the motor by means of the motor drive unit upon detection of the obstruction. An entire movable range of the window is divided into a plurality of moving areas, each divided moving area being set with the reference median established beforehand as a mean value of the parameter values representing the loads applied onto the window during the window movement throughout each divided moving area with no obstruction occurring thereto.

In a first preferred structure according to the invention, the parameter value is a motor load torque computed on the basis of a pulse width of the pulses generated by the pulse generator.

In a second preferred structure according to the invention, the presence of the obstruction to the window movement is determined on the basis of a sum of two values, one value being the reference median set for each of the plurality of divided moving areas, the other value being a reference allowable value established beforehand independently of the divided moving areas, the reference allowable value being changed in keeping with fluctuations of a voltage for driving the motor.

According to a second aspect of the invention, there is provided an obstruction detecting method for use with a power window device comprising: a motor activated to open and close a window by means of a window drive mechanism; a motor drive unit that drives the motor; a pulse generator that generates pulses corresponding to revolutions of the motor; a micro-control unit (MCU) that provides overall drive control; and an operation switch operated manually to instruct the opening and closing of the window. This obstruction detecting method comprises the steps of causing the micro-control unit to detect parameter values representing loads applied onto the window when the window is either opened or closed; to compare the detected parameter values with a predetermined reference median; to determine the presence of an obstruction to the window movement when any detected parameter value is judged to have deviated by at least a predetermined amount from the reference median; and either to stop or to reverse the motor by means of the motor drive unit upon detection of the obstruction. An entire movable range of the window is divided into a plurality of moving areas, each of the divided moving are as being set with the reference median. A first and a second half of each divided moving area are each set with an extrapolated reference median obtained by averaging the reference median established for the moving area in question and the reference median established for the adjacent moving area.

According to a third aspect of the invention, there is provided an obstruction detecting apparatus for use with a power window device comprising: a motor activated to open and close a window by means of a window drive mechanism; a motor drive unit that drives the motor; a pulse generator that generates pulses corresponding to revolutions of the motor; a micro-control unit (MCU) which provides overall drive control and which includes an internal memory; and an operation switch operated manually to instruct the opening and closing of the window. The micro-control unit detects parameter values representing loads applied onto the window when the window is either opened or closed; compares the detected parameter values with a predetermined reference median; determines the presence of an obstruction to the window movement when any detected parameter value is judged to have deviated by at least a predetermined amount from the reference median; and causes the motor drive unit either to stop or to reverse the motor upon detection of the obstruction. An entire movable range of the window is divided into a plurality of moving areas, each of the divided moving areas being set with the reference median. The internal memory has a reference median storage area and a moved window position storage area, the reference median storage area storing the reference medians each set for each of the divided moving areas, the moved window position storage area accommodating position data representing moved positions of the window. If the window is judged to be within a first half of a given divided moving area upon retrieval of the position data from the internal memory and if the reference median set for the preceding divided area is found to be greater than that of the currently measured divided moving area, the micro-control unit obtains an extrapolated reference median by averaging the reference medians of both the currently measured divided moving area and the preceding divided moving area. If the window is judged to be within a second half of a given divided moving area upon retrieval of the position data from the internal memory and if the reference median set for the immediately succeeding divided area is found to be greater than that of the currently measured divided moving area, the micro-control unit obtains an extrapolated reference median by averaging the reference medians of both the currently measured divided moving area and the immediately succeeding divided moving area. The extrapolated reference median thus obtained is used as a basis for judging whether the obstruction has occurred.

According to the obstruction detecting method of the first aspect of the invention, when each of the divided moving areas of the window is to be set before hand with a new reference median, the most recent parameters are first detected as the window is being moved through each of the divided moving areas. The acquired parameters are then averaged and used as a basis for computing a new reference median for each of the divided moving areas of the window. Even if one of the detected parameters is mixed with noise of a relatively high level, the noise component is effectively dispersed by the averaging process throughout the numerous other parameters so that the noise level is reduced to a virtually negligible point. The possible inclusion of noise is thus prevented from affecting the newly established reference medians so that obstructions to the powered window movement are accurately detected at all times.

The first preferred structure according to the invention detects obstructions to the powered window movement as accurately as the preceding obstruction detecting method. At the same time, the accuracy of obstruction detection is enhanced by the fact that the parameters representing motor load torques are in units that are common to the loads on the window as well as to standardized load torques for detecting obstructions.

The second preferred structure of the invention also detects obstructions to the window movement as accurately as the obstruction detecting method according to the first aspect of the invention. In addition, the reference allowable value that is added to the reference median of each divided moving area to serve as a basis for determining obstructions is changed in keeping with fluctuations of the voltage for driving the motor. If the motor driving voltage deviates appreciably from the rated voltage, the reference allowable value is changed to offset adverse effects from the fluctuations in the motor driving voltage. This makes it possible effectively to detect obstructions to the powered window movement free from any fluctuations that may occur in the voltage for driving the motor.

With the obstruction detecting method according to the second aspect of the invention, the entire movable range of the window is divided into a plurality of moving areas, each of the divided moving areas being set with the reference median. At least one of a first and a second half of each divided moving area is set with an extrapolated reference median obtained by averaging the reference median established for the moving area in question and the reference median established for the adjacent moving area. The extrapolated reference median provides a highly accurate and sensitive basis for determining obstructions to the powered window movement.

With the obstruction detecting apparatus according to the third aspect of the invention, the internal memory of the micro-control unit (MCU) has a reference median storage area that stores the reference medians each set for each of the divided moving areas, and a moved window position storage area that accommodates position data representing moved positions of the window. The entire movable range of the window is divided into a plurality of moving areas, each of the divided moving areas being set with a reference median. If the window is judged to be within a first or a second half of a given divided moving area upon retrieval of the position data from the moved window position storage area of the internal memory and if the reference median applicable to the preceding or immediately succeeding divided area and retrieved from the reference median storage area of the memory is found to be greater than the reference median of the currently measured divided moving area, the micro-control unit obtains an extrapolated reference median by averaging the reference medians of both the currently measured divided moving area and the preceding or immediately succeeding divided moving area. The extrapolated reference median thus obtained is used as a basis for judging whether any obstruction has occurred. This apparatus makes it possible to detect obstructions to the powered window movement accurately and sensitively without increasing the storage capacity of the internal memory.

Other objects, features and advantages of the invention will become more apparent upon a reading of the following description and appended drawings.

BRIEF DESCRIPTION OF THE DRAWINGS

FIG. 3 is a graphic representation of typical reference medians and reference allowable values of motor load torques established for each of a plurality of divided moving areas constituting the entire movable range of a motor-powered window;

FIG. 4 is a graphic representation showing how a plurality of edge interval data arrive in one of the divided moving areas in FIG. 3;

FIG. 13 is a graphic representation of typical reference medians and extrapolated reference medians of motor load torques established for some of a plurality of divided moving areas constituting the entire movable range of a motor-powered window.

DESCRIPTION OF THE PREFERRED EMBODIMENTS

Figure 1:
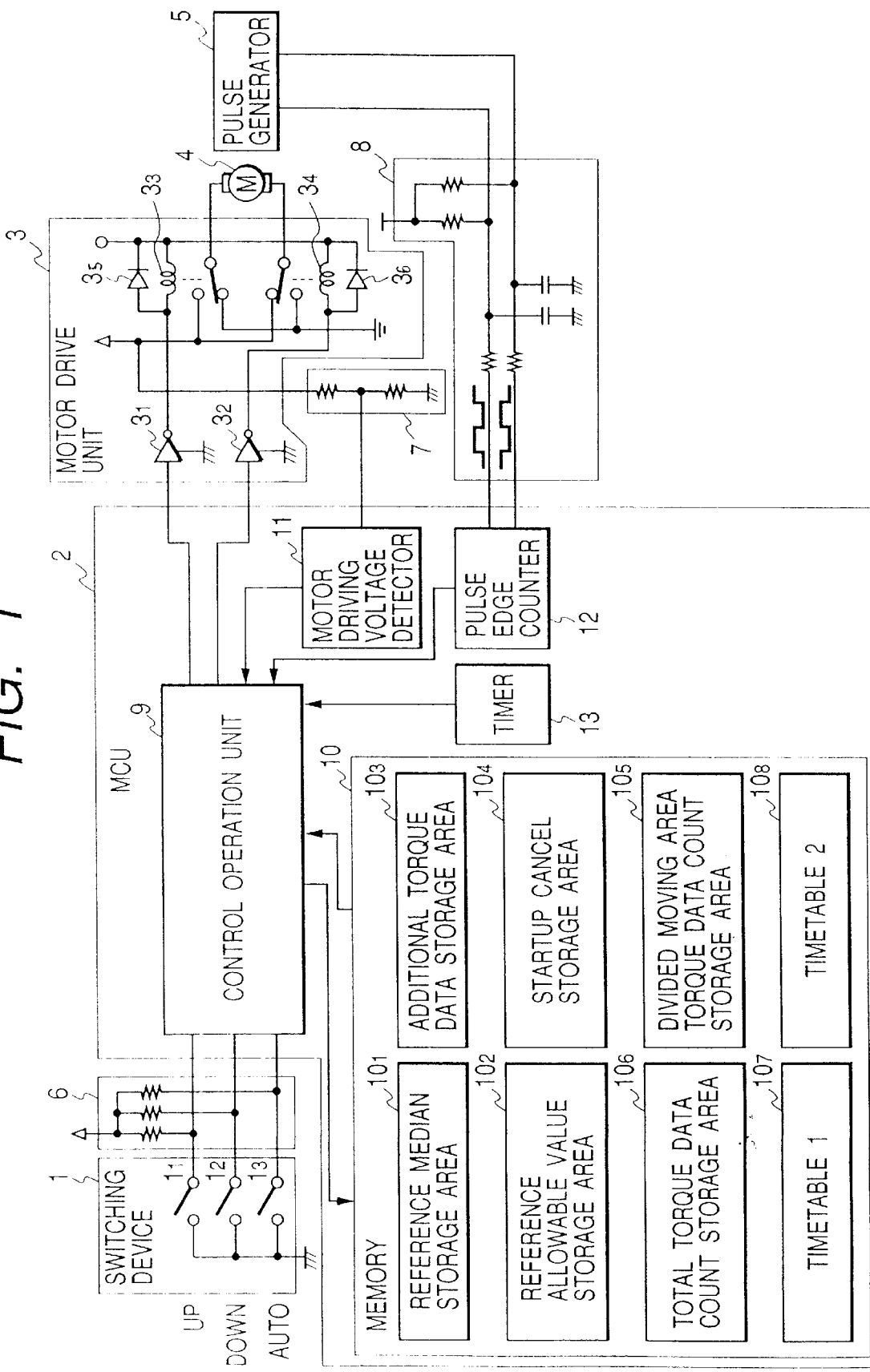
FIG. 1 is a block diagram of a power window device to which to apply an obstruction detecting method practiced as a first embodiment of the invention.

Preferred embodiments of the present invention will now be described with reference to the accompanying drawings. FIG. 1 is a block diagram a power window device to which to apply an obstruction detecting method practiced as the first embodiment of the invention.

As shown in FIG. 1, the power window device comprises a switching unit 1, a micro-control unit (MCU) 2, a motor drive unit 3, a motor 4, a pulse generator 5, a pull-up resistor 6, a potentiometer 7 and a pulse transmission path 8.

Figure 2A:
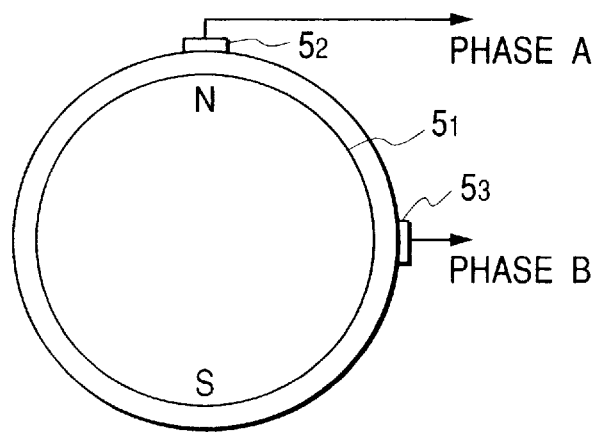
FIG. 2A is a schematic view showing operating principles of a pulse generator generating pulses for use by the power window device of FIG. 1.
Figure 2B:
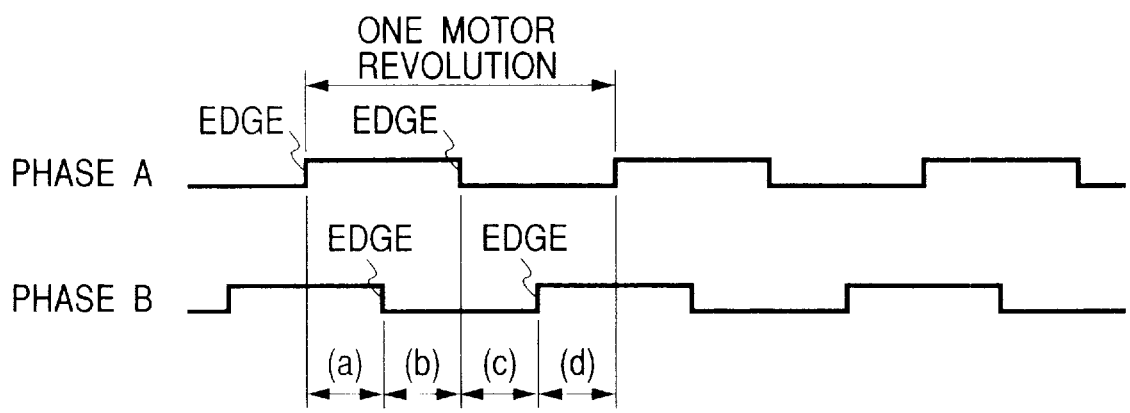
FIG. 2B is a waveform chart depicting two-phase square waves generated by the pulse generator shown in FIG. 2A.

FIG. 2A is a schematic view showing operating principles of a pulse generator generating pulses for use by the power window device of FIG. 1, and FIG. 2B is a waveform chart depicting two-phase square waves generated by the pulse generator of FIG. 2A. As depicted in FIG. 2A, the pulse generator 5 comprises a rotator $5_1$ and Hall elements $5_2$ and $5_3$.

The switching unit 1 has three switches $1_1$, $1_2$ and $1_3$ operated individually. Of the three switches, the switch $1_1$ instructs the window to rise (i.e., to close) when operated and the switch $1_2$ tells the window to descend (i.e., to open) when activated. The window is moved in the designated direction only while the switch $1_1$ or $1_2$ is being operated; the powered window movement stops as soon as the switch is released. The switch $1_3$ is used to designate automatic continuation of the window movement. That is, simultaneously operating the switches $1_3$ and $1_1$ causes the window to start rising (closing). After the switches $1_3$ and $1_1$ are released, the window continues to rise until it reaches the upper limit of the window frame. Likewise, simultaneously activating the switches $1_3$ and $1_2$ causes the window to start descending (closing). With the switches $1_3$ and $1_2$ deactivated, the window descends continuously until it reaches the lower limit of the window frame.

The micro-control unit (MCU) 2 comprises a control operation unit 9, a memory 10, a motor driving voltage detector 11, a pulse edge counter 12 and a timer 13. Of these components, the control operation unit 9 generates a control signal corresponding to an operated state of the switching unit 1. When generated, the control signal is fed through the motor drive unit 3 to the motor 4 that is driven accordingly. At the same time, data processing and arithmetic operations are carried out using data from the motor driving voltage detector 11 or pulse edge counter 12 and by use of data retrieved from the memory 10. The rotating state of the motor 4 is controlled by means of the motor drive unit 3. The memory 10 has six storage areas and two timetables: a reference median storage area $10_1$, a reference allowable value storage area $10_2$, an additional torque data storage area $10_3$, a startup cancel storage area $10_4$, a divided moving area torque data count storage area $10_5$, and a total torque data count storage area $10_6$; as well as a first and a second timetables $10_7$ and $10_8$. Contents of these storage areas and of the timetables will be discussed later. The motor driving voltage detector 11 detects a divided voltage which, representing the voltage of an onboard power source (i.e., battery), develops at a voltage dividing point of the potentiometer 7. The pulse edge counter 12 detects pulse edges of two-phase square wave pulses supplied from the pulse generator 5.

The motor drive unit 3 includes two inverters $3_1$ and $3_2$ for inverting control signals; two relays $3_3$ and $3_4$ for setting the motor to forward or backward rotation or to stop; and two diodes $3_5$ and $3_6$ for suppressing sparks. Given a control signal from the micro-control unit 2, the motor drive unit 3 drives the motor 4 correspondingly.

The motor 4 is connected to the window of the vehicle by means of a window drive mechanism, not shown. Illustratively, the motor 4 closes the window when rotated in the forward direction and opens it when turned in reverse.

The pulse generator 5 is attached directly to the motor 4. As shown in FIG. 2A, the pulse generator 5 comprises a rotator $5_1$ and Hall elements $5_2$ and $5_3$. The rotator $5_1$ mounted on the shaft of the motor 4 and magnetized to have a south and a north pole across its diameter. The Hall elements $5_2$ and $5_3$ are located close to the circumference of the rotator $5_1$ so as to generate two-phase pulses 90 degrees apart as the motor 4 rotates. In rotation, the motor 4 causes the rotator $5_1$ to turn simultaneously. As shown in FIG. 2B, the two Hall elements $5_2$ and $5_3$ detect the magnetized parts of the rotator $5_1$ as the latter rotates. In so doing, the Hall elements $5_2$ and $5_3$ generate two-phase square wave pulses 90 degrees apart, i.e., every one-fourth of a single revolution of the motor 4.

The pull-up resistor 6 is made up of three resistors connected in parallel between the output of the switching unit 1 and input of the micro-control unit (MCU) 2 on the one hand, and a five-volt power supply on the other hand. When the switches $1_1$, $1_2$ and $1_3$ are not operated, the micro-control unit 2 is fed with a supply voltage (5V).

The potentiometer 7 comprises two resistors connected in series between the onboard power supply (battery) and ground. The connection point of the two resistors is connected to the motor driving voltage detector 11 in the micro-control unit 2.

The pulse transmission path 8 has two pull-up resistors connected interposingly between the output of the pulse generator 5 and the 5V power supply; a capacitor interposed between the pulse generator output and ground; and two series resistances connected interposingly between a synchronous output and the input of the pulse edge counter 12 in the micro-control unit 2. In operation, the pulse transmission path 8 transmits two-phase square wave pulses from the pulse generator 5 to the pulse edge counter 12.

When the window is being opened or closed by a rotating motor 4, the two-phase square wave pulses from the pulse generator 5 are sent to the micro-control unit 2 over the pulse transmission path 8. At this point, the pulse edge counter 12 detects pulse edges (leading and trailing) of each of the two-phase square wave pulses. Every time a pulse edge arrives, the pulse edge counter 12 provides an edge detection signal to the control operation unit 9. In turn, the control operation unit 9 causes the timer 13 to count the timings of the received edge detection signals to find an interval between two consecutive edge detection signals that have arrived (called edge interval data hereunder). One edge interval data item is obtained every time the motor 4 rotates 90 degrees.

The power window device shown in FIG. 1 utilizes motor load torque values as the parameter by which to detect obstructions to the motor-powered window movement. Reference medians and reference allowable values are also set in units of motor load torques. For the power window device of FIG. 1, the entire movable range of the window (i.e., between the fully opened and the fully closed position) is divided into a plurality of moving areas on the basis of edge interval data arrival counts. A reference median and a reference allowable value of motor load torques are set for each of the divided moving areas of the window.

FIG. 3 graphically shows typical reference medians and reference allowable values of motor load torques established for each of divided moving areas constituting the entire movable range of the motor-powered window in the power window device of FIG. 1.

In FIG. 3, the axis of ordinate denotes motor load torques, and the axis of abscissa represents edge interval data arrivals counted as the window is moved from the fully opened position to the fully closed position. The lower staggered characteristic curve (S) indicates reference medians of motor load torques, and the upper staggered characteristic curve (A) stands for reference allowable values of motor load torques (reference medians plus reference allowable values to be precise; simply referred to as reference allowable values hereunder). A solid line curve (M) denotes motor load torques measured over time with no obstruction to the powered window movement. A dashed line curve (H) represents motor load torques measured when an obstruction has occurred to the window movement.

The reference medians of motor load torques shown in FIG. 3 denote the torques needed to move the window with no substantial obstruction occurring to the window movement. In practice, the motor load torques are measured in terms of the weight of the window and the mechanical friction between the window and the sash. Where there is no obstruction, the reference medians are determined on the basis of torque values measured in advance. Every time the window is moved, the existing reference medians are replaced by newly established reference medians. That is, the reference medians are continuously learned.

The reference allowable values of motor load torques shown in FIG. 3 remain constant regardless of where the window is currently located in term s of its divided moving areas. Generally, reference allowable values are standardized values. These values are obtained either by converting to motor torques the maximum allowable torques that may be applied to an obstruction to the window movement, or by suitably correcting these converted motor torques.

The motor load torques are computed, as will be described later, from edge interval data and motor driving voltages. A single item of edge interval data is acquired every time the motor 4 rotates 90 degrees. Suppose that the window is moved from its fully opened position to its fully closed position across 36 divided moving areas and that each divided moving area yields 32 edge interval data items. In such a case, a total of about 1200 edge interval data are obtained.

FIG. 4 graphically shows how 32 edge interval data items arrive in one of the 36 divided moving areas indicated in FIG. 3. In FIG. 4, the axis of ordinate represents edge interval data values, and the axis of abscissa denotes edge interval data arrival counts taken when the window is moved from the fully opened position to the fully closed position. Noise components are seen included from place to place.

Figure 5:
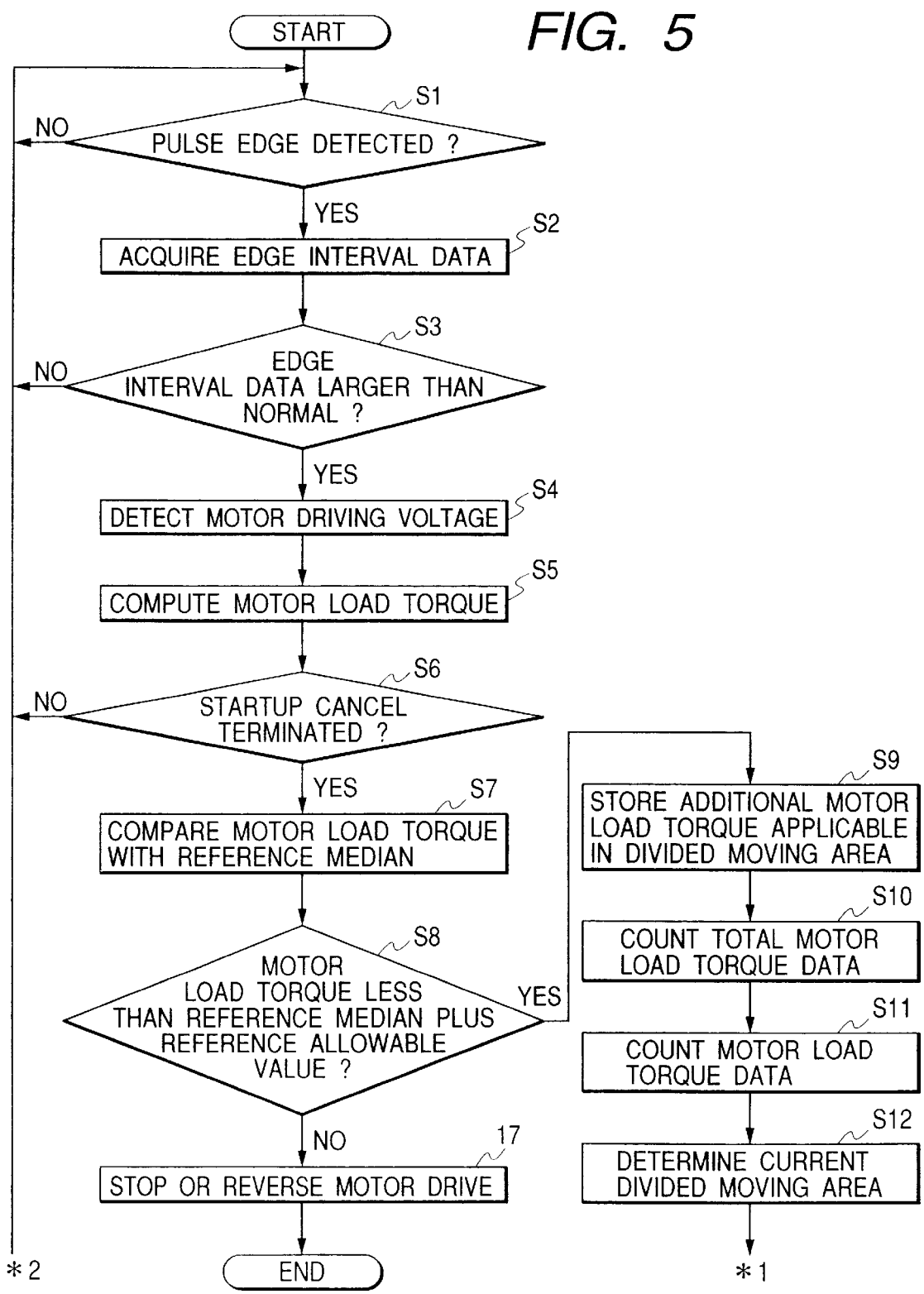
FIG. 5 is a first half of a flowchart of steps outlining how an obstruction to the window movement is detected by use of the power window device of FIG. 1.
Figure 6:
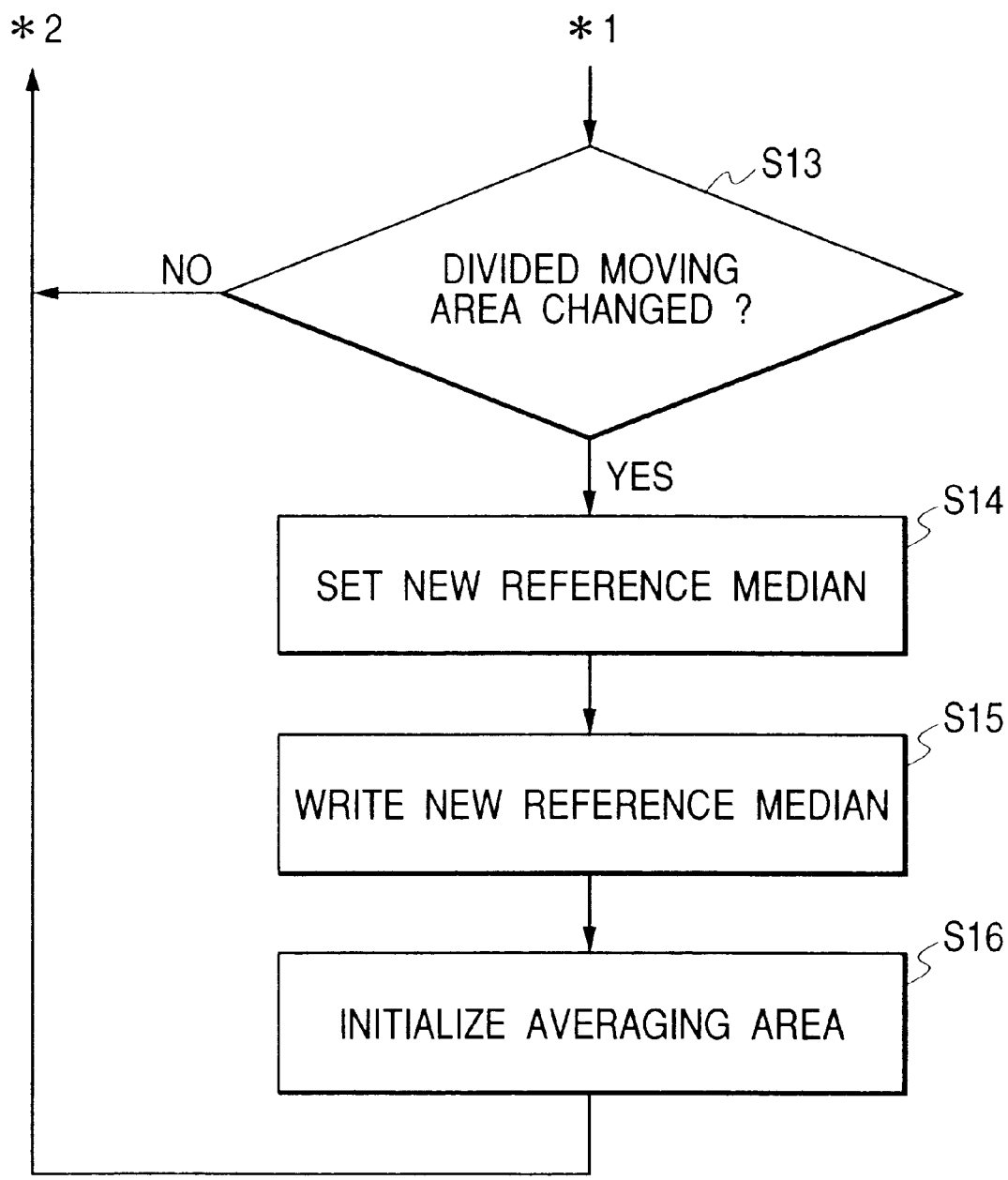
FIG. 6 is a second half of the flowchart whose first half was shown in FIG. 5.

FIG. 5 is a first half of a flowchart of steps outlining how an obstruction to the window movement is detected by use of the power window device of FIG. 1, and FIG. 6 is a second half of the same flowchart. The workings of the power window device in FIG. 1 will be described with reference to FIGS. 5 and 6. Prior to the description, major operations effected by the power window device are outlined below.

Operating one of the switches making up the switching unit 1 (e.g., switch 1$_1$) causes the input of the micro-control unit (MCU) 2 connected to the operated switch (1$_1$) to change from the 5V potential to ground potential. In response to the input ground potential, the control operation unit 9 of the MCU 2 supplies the motor drive unit 3 with a control signal for rotating the motor 4 in the forward direction. Given the control signal, the motor drive unit 3 switches the relays 3$_3$ and 3$_4$ to drive the motor 4 in the forward direction. The forward-turning motor 4 causes the window to close by means of the window drive mechanism coupled to the motor. The motor 4 in rotation causes the pulse generator 5 mounted on the motor to generate two-phase square wave pulses. The generated pulses are sent over the pulse transmission path 8 to the pulse edge counter 12 in the MCU 2.

When the switch 1$_1$ is released, the input of the MCU 2 connected to the switch 1$_1$ changes from the ground potential to the 5V potential. In response to the input 5V potential, the control operation unit 9 of the MCU 2 supplies the motor drive unit 3 with a control signal for stopping the motor 4. Given the control signal, the motor drive unit 3 switches the two relays 3$_3$ and 3$_4$ to stop the supply of power to the motor 4. With the motor 4 thus deactivated, the window stops in its current position. The deactivated motor 4 also stops the pulse generator 5 mounted on the motor from generating two-phase square wave pulses. Thus no pulse reaches the pulse edge counter 12 of the MCU 2.

Operating another switch (e.g., 1$_2$) in the switching unit 1 causes the input of the micro-control unit (MCU) 2 connected to the operated switch (1$_2$) to change Likewise to ground potential. In response to the input ground potential, the control operation unit 9 of the MCU 2 supplies the motor drive unit 3 with a control signal for rotating the motor 4 in the backward direction. Given the control signal, the motor drive unit 3 switches the relays 3$_3$ and 3$_4$ to drive the motor 4 in reverse. The backward-turning motor 4 causes the window to open by means of the window drive mechanism coupled to the motor. Also in this case, The motor 4 in rotation causes the pulse generator 5 mounted on the motor to generate two-phase square wave pulses. The generated pulses are sent over the pulse transmission path 8 to the pulse edge counter 12 in the MCU 2.

Identical or similar operations take place in other cases: when the switch 1$_2$ is released; when the switches 1$_1$ and 1$_3$ are simultaneously operated; and when the switches 1$_2$ and 1$_3$ are simultaneously operated.

In step S1 of FIG. 5, the control operation unit 9 of the MCU 2 causes the pulse edge counter 12 to check to see if an edge is detected from two-phase square wave pulses supplied by the pulse generator 5. If a pulse edge is judged to be detected ("YES" in step S1), step S2 is reached; if a pulse edge has yet to be detected ("NO" in step S1), step S1 is repeated.

In step S2, the control operation unit 2 acquires edge interval data representing a time interval between the arrival of the preceding pulse edge and that of the current pulse edge. Specifically, the pulse edge counter 12 detects pulse edges and the timer 13 counts time intervals between the detected edges for edge interval data acquisition.

In step S3, the control operation unit 3 checks to see if the acquired edge interval exceeds a predetermined time (e.g., 3.5 msec.), i.e., whether the obtained data item denotes a normal edge interval or represents noise. If the edge interval data item exceeds the predetermined time ("Yes" in step S3), step S7 is reached. If the edge interval data item falls short of the predetermined time, i.e., if it is judged to be noise ("NO" in step S3), step S1 is reached again and the subsequent process is repeated. In this judgment, edge interval data mixed with noise are considered to be normal edge interval data.

In step S4, the control operation unit 9 obtains as a motor driving voltage E a divided voltage detected by the motor driving voltage detector 11 through the use of the potentiometer 7.

In step S5, the control operation unit 9 computes a motor load torque Tc using the acquired motor driving voltage E and edge interval data Pw. The computations involved are based on the following expression:

$$Tc = \left\{ \left(kt \cdot \frac{E}{Rm}\right) - Tm \right\} - \frac{ke \cdot kt}{Rm \cdot Pw} \quad (1)$$

where, Tc stands for the motor load torque, E for the motor driving voltage, kt for a motor torque coefficient, Rm for a motor winding resistance, ke for a motor generation coefficient, Pw for edge interval data, and Tm for a motor internal torque.

The first timetable 10$_7$ mentioned above stores the first term (kt·(E/Rm)−Tm) of the expression (1), i.e., the result of the computation denoting a dependent term of the motor driving voltage E, with respect to each motor driving voltage E. The second timetable 10$_8$ accommodates the second term {(ke·kt)/(Rm·Pw)} of the expression (1), i.e., the result of the computation representing a dependent term of the edge interval data Pw, with regard to edge interval data Pw. When the motor load torque Tc is to be computed, the current motor driving voltage E and the edge interval data Pw are first measured. The control operation unit 9 then retrieves from the timetables 10$_7$ and 10$_8$ the results of the computations indicating respectively the dependent terms of the motor driving voltage E and the edge interval data Pw obtained at that point in time. The retrieved results are used as the basis for calculating the motor load torque Tc.

In step S6, the control operation unit 9 checks to see if a starting operation of the motor 4 has ended, i.e., whether a so-called startup cancel is terminated. If the startup cancel is judged to be at an end ("YES" in step S6), step S7 is reached; if the operation has yet to be terminated ("NO" in step S6), step S1 is reached again the subsequent process is repeated.

Whether or not the startup cancel of the motor 4 has ended is judged for the following reasons: while the motor 4 is being started up, there occurs a stage where the internal torque of the motor 4 changes from a maximum to a steady state. If the motor torque value is measured at that stage and is used as a basis for determining obstructions to the window movement, the falsely elevated motor load torque measurement can lead to erroneous detection of an obstruction. Furthermore, the erroneously measured high motor torque, if used to update reference medians, can cause inaccurate new reference medians to be established anew.

For the reasons above, if the starting operation of the motor 4 is not judged to be terminated, motor torque values will not be averaged in preparation for updating reference medians, as will be described later. Whether or not the startup of the motor 4 has ended is determined during a period starting from the arrival of an initial pulse edge until a predetermined number of pulse edges have been detected. While the starting operation of the motor 4 has yet to terminate, the startup cancel storage area $10_4$ of the memory 10 accommodates information to that effect. That information is cleared when the predetermined number of pulse edges have been detected.

In step S7, the control operation unit 9 compares the motor load torque Tc computed in step S5 with the applicable reference median. This comparison involves two storage areas of the memory 10: reference median storage area $10_1$ that stores reference medians established beforehand for all divided moving areas of the window, and reference allowable value storage area $10_2$ that holds reference allowable differences that remain constant regardless of the divided moving are as of the window.

In step S8, the control operation unit 9 checks to see if the motor load torque Tc computed in the divided moving area of the window currently under measurement falls within a range of the predetermined reference median for the divided moving area in question supplemented by the applicable reference allowable value. If the motor load torque Tc is judged to fall within the tolerable range ("YES" in step S8), step S9 is reached. If the motor load torque Tc is judged to have exceeded the tolerable range ("NO" in step S8), step S17 is reached.

In step S9, the control operation unit 9 adds up all motor load torques Tc obtained in the single divided moving area of the window under measurement at that point. The acquired sum is placed into the additional torque data storage area $10_3$ of the memory 10.

In step S10, the control operation unit 9 counts the total number of motor load torques Tc obtained in the single divided moving area of the window now being measured. The acquired torque count is stored into the divided moving area torque data count storage area $10_5$ of the memory 10.

In step S11, the control operation unit 9 counts the total number of motor load torques Tc obtained starting from the fully opened position of the window up to the divided moving area of the window currently under measurement. The count is stored into the total torque data count storage area $10_6$.

In step S12, the control operation unit 9 determines the divided moving area of the window currently in effect on the basis of the total torque data count held in the total torque data count storage area $10_6$.

In step S13 of FIG. 6, the control operation unit 9 checks on the basis of the judgment in step S12 to see if the currently measured divided moving area of the window is replaced by the next divided moving area. If the next divided moving area of the window is judged to be reached ("YES" in step S13), control is passed on to step S14. If the next divided moving area of the window has yet to be reached ("NO" in step S13), control is returned to step S1 and the subsequent process is repeated.

In step S14, the control operation unit 9 establishes a new reference median based on the motor load torque Tc computed for the single divided moving area of the window. The new reference median is determined on the basis of the edge interval data acquired for the divided moving area of the window in question. Illustratively, as shown in FIG. 5, if one edge interval data item (a pulse count of 75) consists of only noise, the data is rejected in step S3. The noise is thus not included in the averaging of motor load torques Tc. Even if another edge interval data item (a pulse count of 84) is mixed with noise to take on a large value, that value is subjected to the averaging process involving not only the motor load torque Tc computed from the elevated value but also numerous other motor load torques Tc. Thus the presence of noise-overlaid large edge interval data does not result in a new reference median being erroneously established.

In step S15, the control operation unit 9 writes the reference median newly established in step S14 to the reference median storage area $10_1$ in the memory 10. The new reference median replaces the current reference median held so far in the memory area.

In step S16, the control operation unit 9 initializes averaging areas in the memory 10 which are used to average motor load torques Tc, i.e., the additional torque data storage area $10_3$, and the divided moving area torque data count storage area $10_5$. After the initialization, step S1 is reached again and the ensuing steps are repeated.

The steps constituting the flowchart above are carried out repeatedly until the motor 4 is stopped by operation of the switch $1_1$ or $1_2$ to halt the window movement, or until the window is stopped or moved in the opposite direction when the motor 4 is stopped or reversed upon detection of an obstruction to the window movement in step S17, to be described below.

In step S17 of FIG. 5, the control operation unit 9 supplies the motor drive unit 3 with a control signal to switch the relays $3_3$ and $3_4$ so as to stop or reverse the motor 4. This action stops or reverses the window movement to prevent damage to an object obstructing the powered window movement.

In the above flowchart, steps S2 through S6 constitute a process for acquiring edge interval data; steps S7 and S8 make up a process for judging the presence of an obstruction to the window movement; steps S9 through S16 form a process for updating reference medians of motor load torques; and step S17 provides a process for stopping or reversing the motor drive.

Suppose that, with the power window device of FIG. 1, the steps of FIGS. 5 and 6 are carried out to rove the window from the fully opened position to the fully closed position with no obstruction hampering the window movement. In that case, the acquired motor load torques take on the characteristic plotted by the solid line curve (M) in FIG. 3. In each of the divided moving areas of the window, the motor load torques do not exceed the reference median set for the area in question supplemented by the applicable reference allowable value.

On the other hand, an obstruction may occur halfway through the movement of the window from an intermediate position to the fully closed position. In such a case, the acquired motor load torques take on the characteristic indicated by the dashed line curve (H) in FIG. 3. In the divided moving area of the window in question, the motor load torques exceed the reference median set for that area and supplemented by the applicable reference allowable value.

As described, according to the obstruction detecting method for use with a power window device and practiced as the first embodiment, each of a plurality of divided moving areas of the window is furnished beforehand with a new reference median as follows: a plurality of new parameters detected as the window is moving (i.e., opened or closed) through each divided moving area are averaged. The mean value thus obtained is used as a basis for computing a new reference median. Even if one of the detected parameters is mixed with noise of a relatively high level, the large noise component is effectively dispersed throughout the other numerous parameters during the averaging process. The overlapping noise is thus reduced to a negligible level, leaving the newly established reference median substantially free of error. This makes it possible accurately to detect obstructions that may occur to the powered window movement.

According to the first embodiment, the motor load torque Tc is computed by use of the following values: the result of the computation denoting a dependent term of the motor driving voltage E corresponding to each motor driving voltage E included in the expression (1) shown above, the dependent term being stored in the first timetable $10_7$ of the memory 10; and the result of the computation denoting a dependent term of the edge interval data Pw corresponding to each of the edge interval data Pw included in the same expression (1), the dependent term being accommodated in the second timetable $10_8$. This arrangement allows the motor load torque Tc to be calculated at a very high speed every time an edge interval data item Pw and a motor driving voltage E are acquired. There is thus little delay in computing the motor load torque Tc.

The obstruction detecting method described above as the first embodiment of the invention does not take into consideration any effects from a change in the driving voltage of the motor 4, i.e., a deviation of the output voltage of the onboard battery from a rated voltage. If such a deviation of the motor driving voltage from the rated voltage does take place, there occurs a fluctuation in the time required for the motor 4 to stop after its deactivation, i.e., in the rotation stop time affected by an inertia of the motor 4. As a result, the judgment of the presence of an obstruction to the window movement is slightly affected by changes in the driving voltage of the motor 4.

Figure 10:
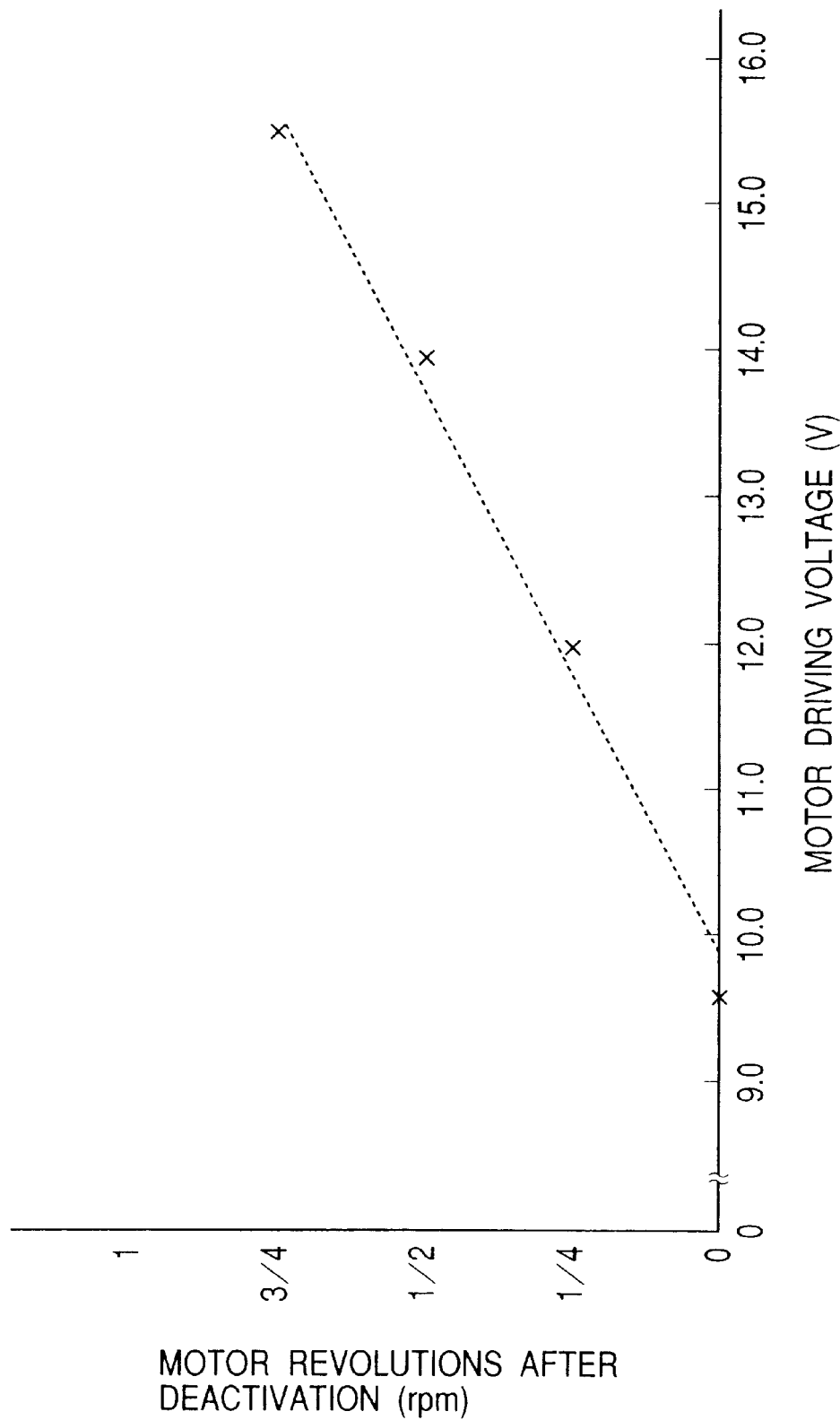
FIG. 10 is a graphic representation of motor revolutions affected by an inertia of the motor after its deactivation following changes in the motor driving voltage.

FIG. 10 graphically plots motor revolutions affected by an inertia of the motor after its deactivation following changes in the motor driving voltage. In FIG. 10, the axis of ordinate represents motor revolutions affected by inertia following motor deactivation, and the axis of abscissa denotes motor driving voltages. The graphic representation of FIG. 10 shows how motor revolutions are typically affected by inertia following motor deactivation where the motor driving voltage changes between 10.0V and 15.5V with respect to the rated voltage of 12V.

As indicated by the characteristic curve in FIG. 10, when the motor driving voltage equals the rated voltage of 12V, the motor rotates about 90 degrees by inertia following its deactivation. When the motor driving voltage is lower than the rated voltage (e.g., 10.0V), the motor is virtually unaffected by inertia following the deactivation of the motor. Where the motor driving voltage is higher than the rated voltage (e.g., 14.0V), the motor rotates about 180 degrees by inertia following the stop of the motor. When the motor driving voltage is even higher (e.g., 15.5V), the motor rotates by 270 degrees by inertia following the motor deactivation.

A second embodiment of the invention takes into account such effects from changes in the motor driving voltage. That is, the second embodiment allows reference allowable values to vary as needed in keeping with fluctuations in the motor driving voltage. The purpose of this scheme is to prevent the detection of an obstruction to the window movement from being affected by any changes in the motor driving voltage.

Figure 7:
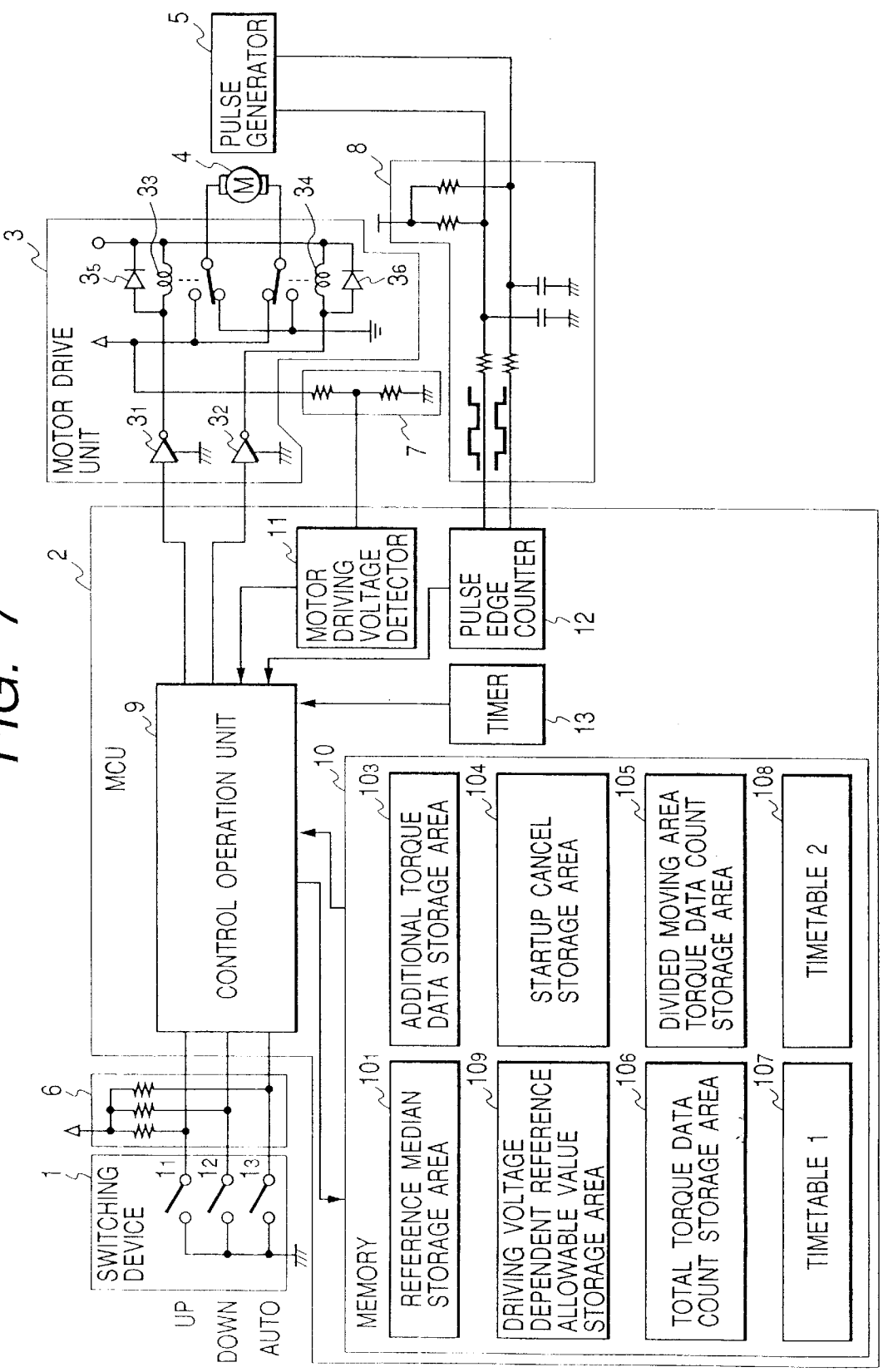
FIG. 7 is a block diagram of a power window device to which to apply an obstruction detecting method practiced as a second embodiment of the invention.

FIG. 7 is a block diagram of a power window device to which to apply an obstruction detecting method practiced as the second embodiment of the invention. Of the reference numerals in FIG. 7, those already used in FIG. 1 designate like or corresponding parts.

Figure 8:
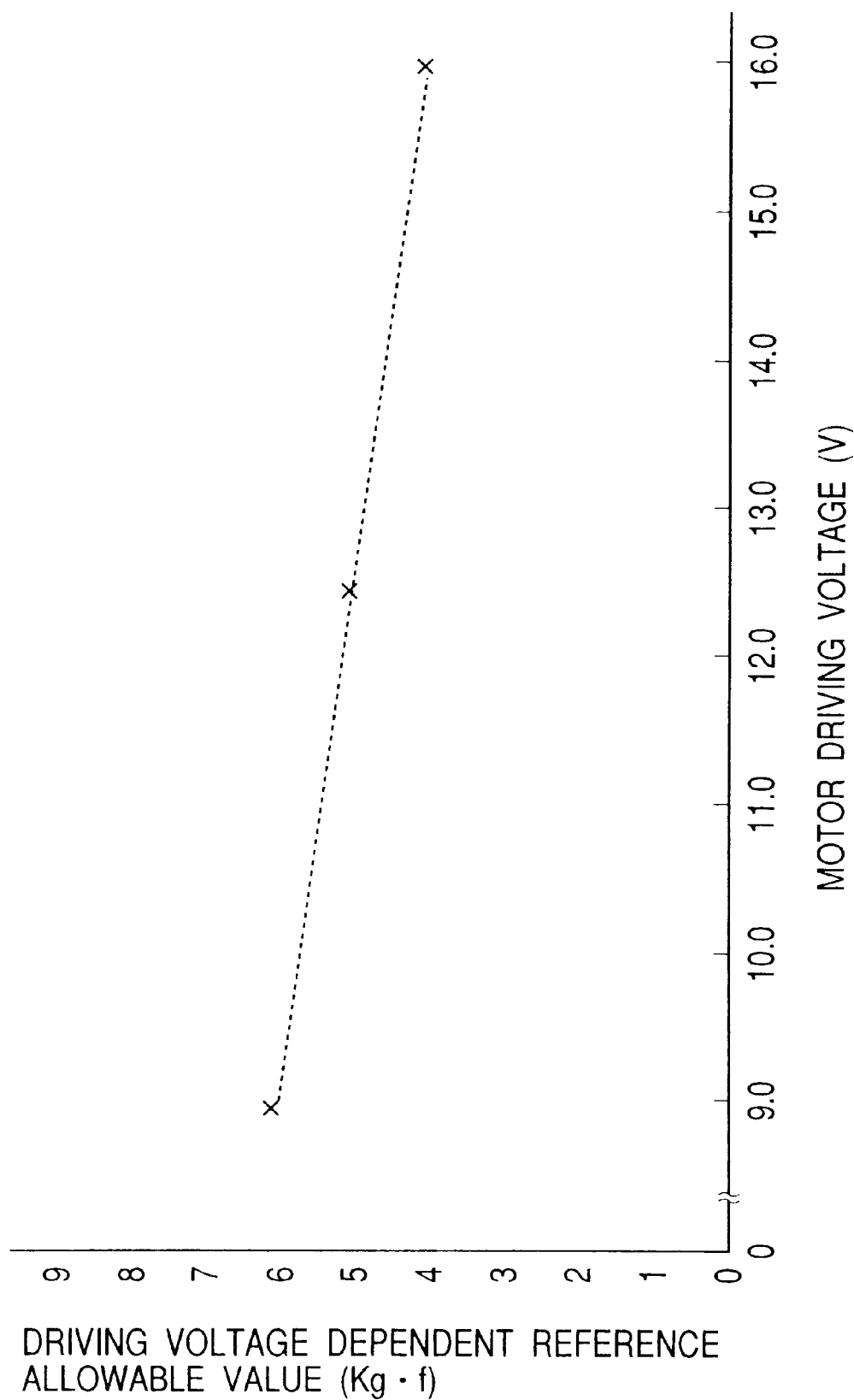
FIG. 8 is a graphic representation of typical reference allowable values corresponding to motor driving voltages stored in a driving voltage-dependent reference allowable value storage area of a memory in the power window device of FIG. 7.

FIG. 8 graphically illustrates typical reference allowable values corresponding to motor driving voltages stored in a driving voltage-dependent reference allowable value storage area $10_9$ in the memory 10 of the MCU 2 inside the power window device of FIG. 7. In FIG. 8, the axis of ordinate represents reference allowable values, and the axis of abscissa denotes motor driving voltages. The graphic representation of FIG. 8 shows how reference allowable values are typically changed when the motor driving voltage varies between 9.0V and 16.0V.

The power window device of FIG. 7 for use with the second embodiment differs from the power window device of FIG. 1 used by the first embodiment only in the following aspect: as shown in FIG. 7, the power window device of FIG. 7 includes the driving voltage-dependendent reference allowable value storage area $10_9$ in the memory 10 of the MCU 2, replacing the reference allowable value storage area $10_2$ of the power window device in FIG. 1. As its name implies, the driving voltage-dependent reference allowable value storage area $10_9$ stores reference allowable values which vary depending on the motor driving voltage. All other components are the same in both setups of FIGS. 7 and 1, so that the constitution of the power window device in FIG. 7 will not be described further.

Figure 9:
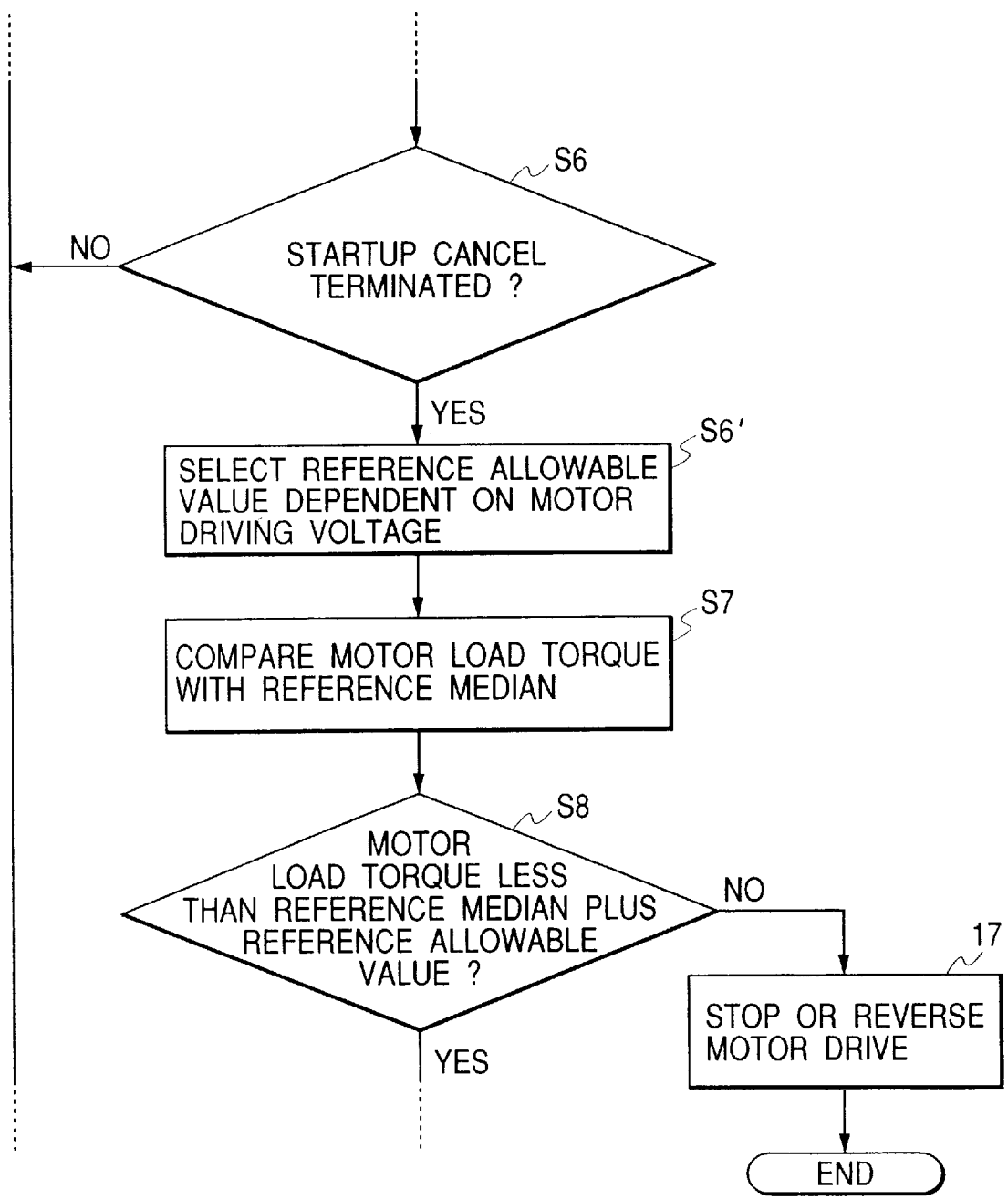
FIG. 9 is a flowchart of steps outlining how an obstruction to the window movement is detected by use of the power window device of FIG. 7.

FIG. 9 is a flowchart of steps outlining how an obstruction to the window movement is detected by use of the power window device of FIG. 7. This flowchart highlights steps specific to the power window device of FIG. 7, the other steps being identical to their counterparts for the power window device of FIG. 1. Of the steps included in FIG. 9, those already shown in FIG. 5 are given the same reference numerals.

Steps S1 through S6 are the same as their counterparts in FIG. 5.

Instep S6' of FIG. 9, the control operation unit 9 detects the motor driving voltage using the motor driving voltage detector 11. A driving voltage-dependent reference allowable value corresponding to the detected motor driving voltage is acquired by retrieval from the driving voltage-dependent reference allowable value storage area $10_9$.

In step S7, the control operation unit 9 compares the motor load torque Tc computed in step S5 with the applicable reference median. This comparison involves the use of the reference median and the comparable driving voltage-dependent reference allowable value retrieved respectively from the reference median storage area $10_1$ and driving voltage-dependent reference allowable value storage area $10_9$ in the memory 10.

In step S8, the control operation unit 9 checks to see if the motor load torque Tc computed for the currently measured divided moving area of the window falls within a range of the reference median predetermined for the moving area in question and supplemented by the retrieved driving voltage-dependent reference allowable value. If the motor load torque Tc is judged to be within the range ("YES" in step S8), step S9 is reached. If the motor load torque Tc is judged to have exceeded the range in question, step S17 is reached.

The process following step S9 and the operation of step S17 are the same as those of the comparable steps in FIGS. 5 and 6.

As described, the obstruction detecting method for use with a power window device and practiced as the second embodiment of the invention permits detection of an obstruction to the powered window movement as accurately as the first embodiment. Furthermore, the second embodiment supplements the reference median with the driving voltage-dependent reference allowable value as the basis for judging obstructions to the window movement, the reference allowable value being varied depending on the change in the motor driving voltage. Under this scheme, deviations of the motor driving voltage from its rated voltage are effectively offset by the driving voltage-dependent reference allowable value. This makes it possible to detect obstructions to the powered window movement free from the effects of fluctuations in the motor driving voltage.

A third embodiment of the invention will now be described. The third embodiment is based on improvements in the power window device for use with the first embodiment. Specifically, each divided moving area of the window is bisected. For the judgment of obstructions to the window movement, one half of a single divided moving area is subject to the reference median established beforehand for the area in question. The other half of the divided moving area of the window is subject to a mean value obtained by averaging the reference median set for the area in question and the reference median established for the adjacent divided moving area of the window.

Figure 11:
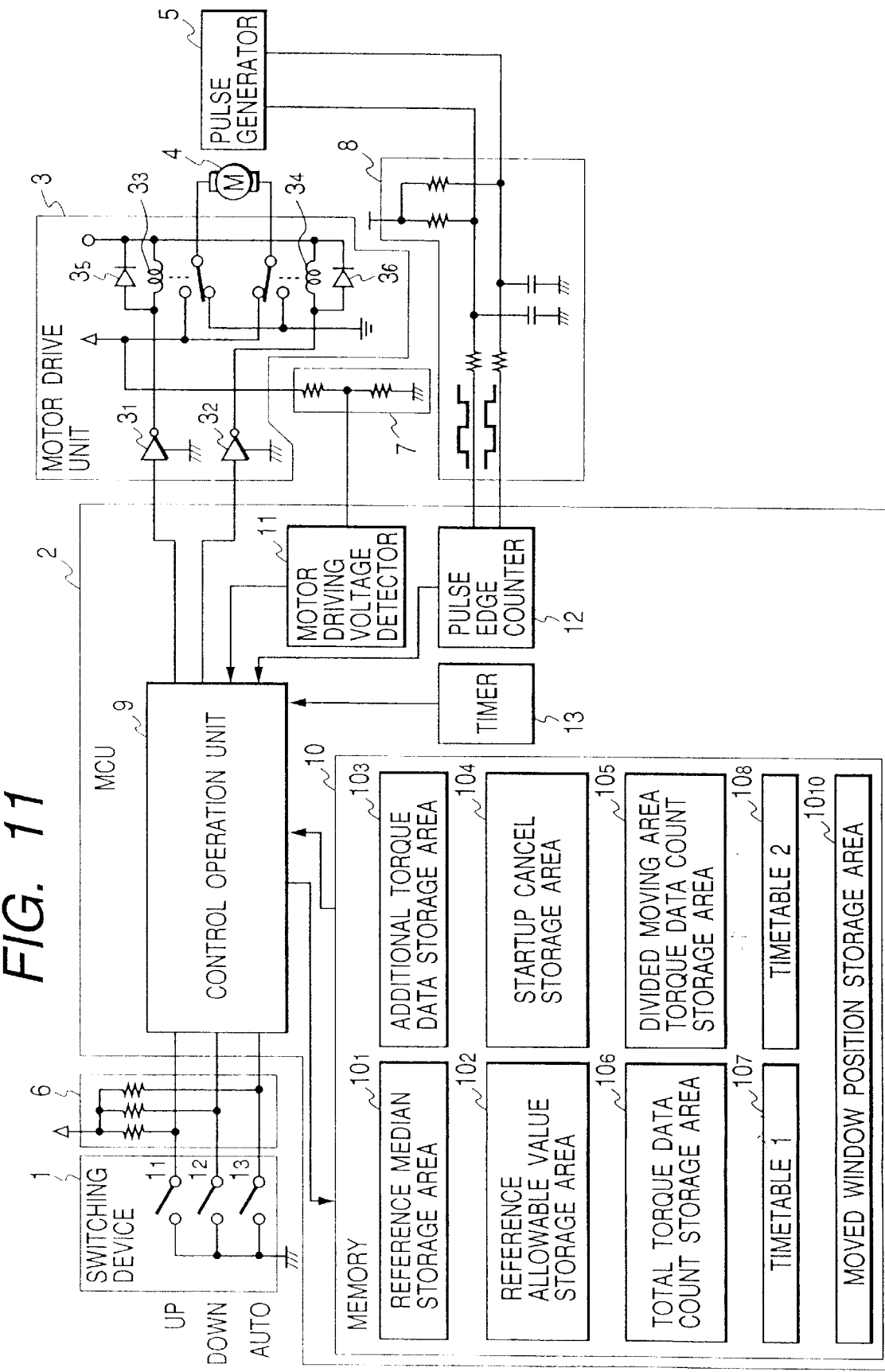
FIG. 11 is a block diagram of an obstruction detecting apparatus constituted by the power window device of the first embodiment and practiced as a third embodiment of the invention.

FIG. 11 is a block diagram of an obstruction detecting apparatus constituted by the power window device of the first embodiment and practiced as the third embodiment of the invention. Of the reference numerals in FIG. 11, those already used in FIG. 1 designate like or corresponding parts.

The obstruction detecting apparatus of FIG. 11 practiced as the third embodiment differs from the power window device of FIG. 1 used by the first embodiment only in the following aspect: as depicted in FIG. 11, the apparatus of FIG. 11 comprises a moved window position storage area $10_{10}$ in addition to the storage areas of the power window device in FIG. 1. The moved window position storage area $10_{10}$ stores data for judging which divided area the window is currently positioned in and whether the window position is in a first or a second half of the divided area in question. All other components are the same in both setups of FIGS. 11 and 1, so that the constitution of the obstruction detecting apparatus of FIG. 11 will not be described further.

FIG. 13 graphically shows typical reference medians and extrapolated reference medians of motor load torques established for some of a plurality of divided moving areas constituting the entire movable range of a motor-powered window.

In FIG. 13, the axis of ordinate denotes motor load torques, and the axis of abscissa represents divided moving areas of the window in terms of time interval counts taken as the window is moved from its fully opened position to its fully closed position. The lower solid-line staggered characteristic curve (S) in FIG. 13 plots reference medians of motor load torques in the divided moving areas of the window. The lower broken-line characteristic curve (H) indicates extrapolated reference medians of motor load torques in the divided moving areas of the window. The upper broken-line staggered characteristic curve (A) displays reference allowable values of motor torques (reference median plus; reference allowable value, or extrapolated reference median plus reference allowable value to be precise).

Figure 12:
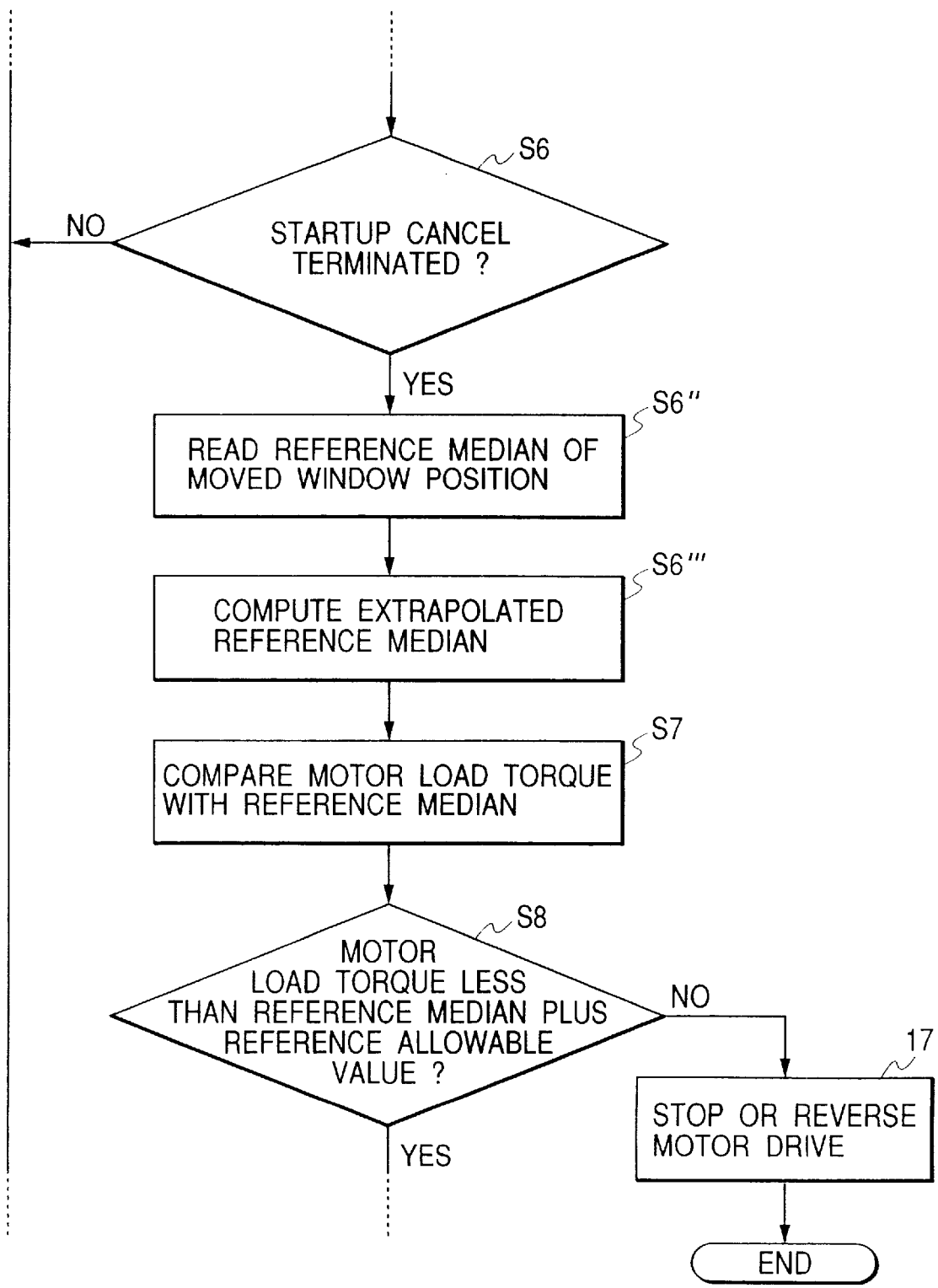
FIG. 12 is a flowchart of steps outlining how an obstruction to the window movement is detected by use of the apparatus of FIG. 11.

FIG. 12 is a flowchart of steps outlining how an obstruction to the window movement is detected by use of the obstruction detecting apparatus of FIG. 11. This flowchart highlights steps specific to the apparatus of FIG. 11, the other steps being identical to their counterparts for the power window device of FIG. 1. Of the steps included in FIG. 12, those already shown in FIG. 5 are given the same reference numerals.

Steps S1 through S6 are the same as their counterparts in FIG. 5.

In step S6" of FIG. 12, the control operation unit 9 determines whether the window is positioned in the first or the second half of the currently measured divided moving area of the window by comparing the count on the timer 13 with the count held in the moved window position storage area $10_{10}$. If the window is judged to be positioned in the first half of the divided moving area in question, the reference median corresponding to the moving area in question (called a first reference median) and the reference median applicable to the preceding moving area (called a second reference median) are retrieved from the reference median storage area $10_1$. If the window is judged to be positioned in the second half of the divided moving area in question, the reference median corresponding to the moving area in question (the first reference median) and the reference median applicable to the immediately ensuing moving area (the second reference median) are retrieved from the reference median storage area $10_1$. The first and the second half of each divided window moving area are obtained by bisecting the latter, as shown in FIG. 13.

In step S6''', the control operation unit 9 compares the first reference median with the second reference median. If the first reference median is judged to be smaller than the second reference median, the control operation unit 9 averages the first and the second reference medians to obtain an extrapolated reference median.

In step S7, the control operation unit 9 compares the motor load torque Tc computed in step S5 with either the reference median or the extrapolated reference median. It the first reference median is judged to be greater than the second reference median in the comparison, then the motor load torque Tc is compared with the reference median corresponding to the divided moving area in question (first reference median) and supplemented by the reference allowable value which is retrieved from the reference allowable value storage area $10_2$ and which remains constant regardless of the divided moving areas. If the first reference median is judged to be smaller than the second reference median, then the motor load torque Tc is compared with the extrapolated reference median computed in step S6''' and supplemented by the reference allowable value retrieved from the reference allowable value storage area $10_2$.

In step S8, the control operation unit 9 checks to see if the motor load torque Tc computed for the currently measured divided moving area falls within a range of the reference median set for the moving area in question and supplemented by the reference allowable value or by the extrapolated reference allowable value (called a tolerable range). If the motor load torque Tc is judged to be within the tolerable range ("YES" in step S8), step S9 is reached. If the motor load torque Tc is judged to have exceeded the tolerable range ("NO" in step S8), step 17 is reached.

The process following step S9 and the operation of step S17 are the same as those of the comparable steps in FIGS. 5 and 6.

As described, the obstruction detecting apparatus constituted by the power window device of the first embodiment and practiced as the third embodiment of the invention comprises the reference median storage area $10_1$ and moved window position storage area $10_{10}$ in the memory 10 of the MCU 2. Each of a plurality of divided moving areas constituting the entire movable range of the motor-powered window is bisected into a first and a second half. In at least one of the half portions making up each divided moving area, an obstruction to the window movement is judged on the basis of the extrapolated reference median obtained by averaging two medians: the reference median established for the divided moving area in question and retrieved from the reference median storage area $10_1$, and the reference median set for the adjacent divided moving area and also retrieved from the reference median storage area $10_1$. This makes it possible to detect obstructions to the window movement in an accurate and sensitive manner without enlarging the capacity of the memory 10.

As a variation of the third embodiment, the numerical basis for judging obstructions to the window movement may be provided as follows: the first half of each divided moving area of the window may be furnished uniquely with the reference median corresponding to the moving area in question, and the second half of the area may be set with an extrapolated reference median obtained by averaging the reference median applicable to the moving area in question and the reference median set for the immediately ensuing divided moving area.

The major features and benefits of this invention are summarized below:

According to the obstruction detecting method based on one aspect of the invention, when each of the divided moving areas of the window is to be set beforehand with a new reference median, the most recent parameters are first detected as the window is being moved (i.e., opened or closed) through each of the divided moving areas. The acquired parameters are then averaged and used as a basis for computing a new reference median for each of the divided moving areas of the window. Even if one of the detected parameters is mixed with noise of a relatively high level, the noise component is effectively dispersed by the averaging process throughout the numerous other parameters so that the noise level is reduced to a virtually negligible point. The possible inclusion of noise is thus prevented from affecting the newly established reference medians so that obstructions to the powered window movement are accurately detected at all times.

One preferred structure according to the invention detects obstructions to the powered window movement as accurately as the obstruction detecting method according to the first aspect of the invention. At the same time, the accuracy of obstruction detection is enhanced by the fact that the parameters representing motor load torques are in units that are common to the loads on the window as well as to standardized load torques for detecting obstructions.

Another preferred structure of the invention also detects obstructions to the window movement as accurately as the above obstruction detecting method. In addition, the reference allowable value that is added to the reference median of each divided moving area to serve as a basis for determining obstructions is changed in keeping with fluctuations of the voltage for driving the motor. If the motor driving voltage deviates appreciably from the rated voltage, the reference allowable value is changed to offset adverse effects from the fluctuations in the motor driving voltage. This makes it possible effectively to detect obstructions to the powered window movement free from any fluctuations that may occur in the voltage for driving the motor.

With the obstruction detecting method according to another aspect of the invention, the entire movable range of the window is divided into a plurality of moving areas, each of the divided moving areas being set with the reference median. At least one of a first and a second half of each divided moving area is set with an extrapolated reference median obtained by averaging the reference median established for the moving area in question and the reference median established for the adjacent moving area. The extrapolated reference median provides a highly accurate and sensitive basis for determining obstructions to the powered window movement.

With the obstruction detecting apparatus according to a further aspect of the invention, the internal memory of the MCU has a reference median storage area that stores the reference medians each set for one of the divided moving areas, and a moved window position storage area that accommodates position data representing moved positions of the window. The entire movable range of the window is divided into a plurality of moving areas, each of the divided moving areas being set with a reference median. If the window is judged to be within a first or a second half of a given divided moving area upon retrieval of the position data from the moved window position storage area of the internal memory and if the reference median applicable to the preceding or immediately succeeding divided area and retrieved from the reference median storage area of the memory is found to be greater than the reference median of the currently measured divided moving area, the MCU obtains an extrapolated reference median by averaging the reference medians of both the currently divided moving area and the preceding or immediately succeeding moving area. The extrapolated reference median thus obtained is used as a basis for judging whether any obstruction has occurred to the window movement. This apparatus makes it possible to detect obstructions to the powered window movement accurately and sensitively without increasing the storage capacity of the internal memory.

While preferred embodiments of the invention have been described using specific terms, such description is for illustrative purposes only, and it is to be understood that changes and variations may be made without departing from the spirit or scope of the following claims.

What is claimed is:

1. An obstruction detecting method for use with a power window device comprising:

a motor activated to open and close a window by means of a window drive mechanism;

a motor drive unit that drives said motor;

a pulse generator that generates pulses corresponding to revolutions of said motor;

a micro-control unit that provides overall drive control; and an operation switch operated manually to instruct the opening and closing of said window;

said obstruction detecting method comprising the steps of:
causing said micro-control unit to detect parameter values representing loads applied onto said window when said window is either opened or closed;
causing said micro-control unit to compare the detected parameter values with a predetermined reference median;
causing said micro-control unit to determine the presence of an obstruction to the window movement when any detected parameter value is judged to have deviated by at least a predetermined amount from said reference median; and
causing said micro-control unit either to stop or to reverse said motor by means of said motor drive unit upon detection of said obstruction;

wherein an entire movable range of said window is divided into a plurality of moving areas, each divided moving area being set with said reference median established beforehand as a mean value of the parameter values representing the loads applied onto said window during the window movement throughout each divided moving area with no obstruction occurring thereto.

2. An obstruction detecting method for use with a power window device according to claim 1, wherein said parameter value is a motor load torque computed on the basis of a pulse width of said pulses generated by said pulse generator.

3. An obstruction detecting method for use with a power window device according to claim 1, wherein the presence of said obstruction to the window movement is determined on the basis of a sum of two values, one value being said reference median set for each of said plurality of divided moving areas, the other value being a reference allowable value established beforehand independently of said plurality of divided moving areas, said reference allowable value being changed in keeping with fluctuations of a voltage for driving said motor.

4. An obstruction detecting method for use with a power window device comprising:

a motor activated to open and close a window by means of a window drive mechanism;

a motor drive unit that drives said motor;

a pulse generator that generates pulses corresponding to revolutions of said motor;

a micro-control unit that provides overall drive control; and an operation switch operated manually to instruct the opening and closing of said window;

said obstruction detecting method comprising the steps of:

causing said micro-control unit to detect parameter values representing loads applied onto said window when said window is either opened or closed;

causing said micro-control unit to compare the detected parameter values with a predetermined reference median;

causing said micro-control unit to determine the presence of an obstruction to the window movement when any detected parameter value is judged to have deviated by at least a predetermined amount from said reference median; and causing said micro-control unit either to stop or to reverse said motor by means of said motor drive unit upon detection of said obstruction;

wherein an entire movable range of said window is divided into a plurality of moving areas, each of the divided moving areas being set with said reference median, and wherein a first and a second half of each divided moving area are each set with an extrapolated reference median obtained by averaging the reference median established for the moving area in question and the reference median established for the adjacent moving area.

5. An obstruction detecting apparatus for use with a power window device comprising:

a motor activated to open and close a window by means of a window drive mechanism;

a motor drive unit that drives said motor;

a pulse generator that generates pulses corresponding to revolutions of said motor;

a micro-control unit which provides overall drive control and which includes an internal memory; and an operation switch operated manually to instruct the opening and closing of said window;

wherein said micro-control unit detects parameter values representing loads applied onto said window when said window is either opened or closed; compares the detected parameter values with a predetermined reference median; determines the presence of an obstruction to the window movement when any detected parameter value is judged to have deviated by at least a predetermined amount from said reference median; and causes said motor drive unit either to stop or to reverse said motor upon detection of said obstruction;

wherein an entire movable range of said window is divided into a plurality of moving areas, each of the divided moving areas being set with said reference median;

wherein said internal memory has a reference median storage area and a moved window position storage area, said reference median storage area storing the reference medians each set for each of said divided moving areas, said moved window position storage area accommodating position data representing moved positions of said window;

wherein, if said window is judged to be within a first half of a given divided moving area upon retrieval of said position data from said internal memory and if the reference median set for the preceding divided area is found to be greater than that of the current divided moving area, said micro-control unit obtains an extrapolated reference median by averaging the reference medians of both the current divided moving area and the preceding divided moving area;

wherein, if said window is judged to be within a second half of a given divided moving area upon retrieval of said position data from said internal memory and if the reference median set for the immediately succeeding divided area is found to be greater than that of the current divided moving area, said micro-control unit obtains an extrapolated reference median by averaging the reference medians of both the current divided moving area and the immediately succeeding divided moving area; and wherein said extrapolated reference median is used as a basis for judging whether said obstruction has occurred.

\* \* \* \* \*